Aug. 4, 1931.   K. DAVIS   1,817,298
PROCESS AND MECHANISM FOR SEPARATING INTERMIXED DIVIDED MATERIALS
Original Filed March 11, 1926   8 Sheets-Sheet 3
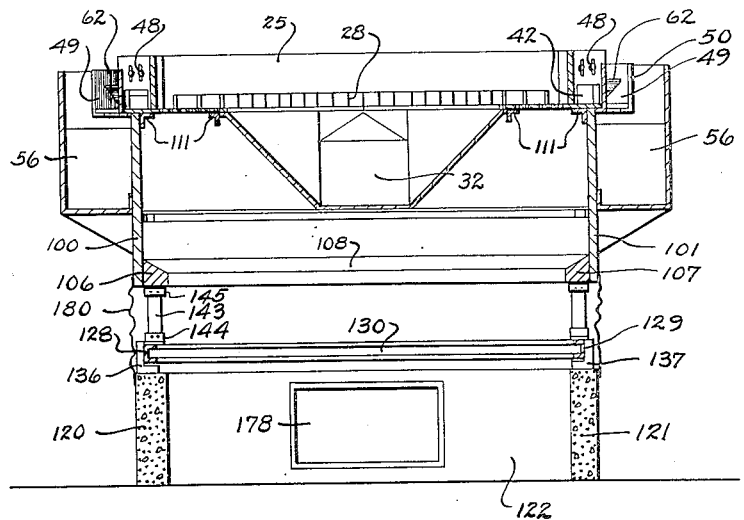
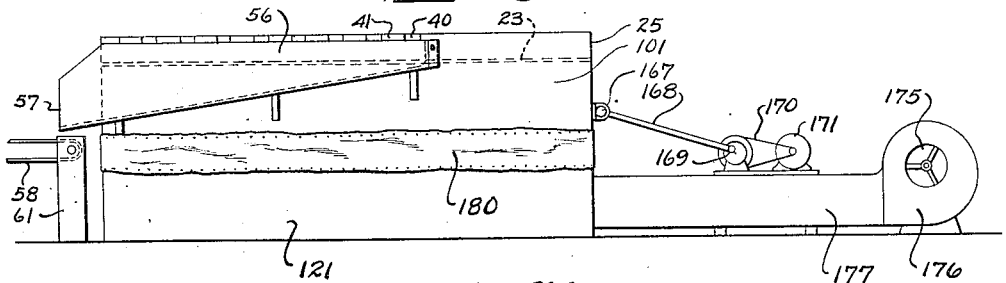
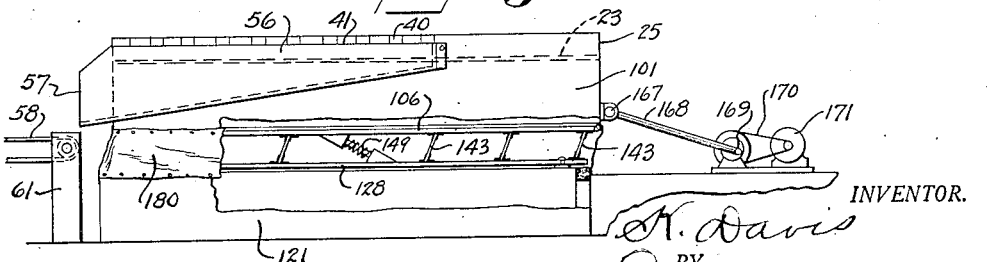

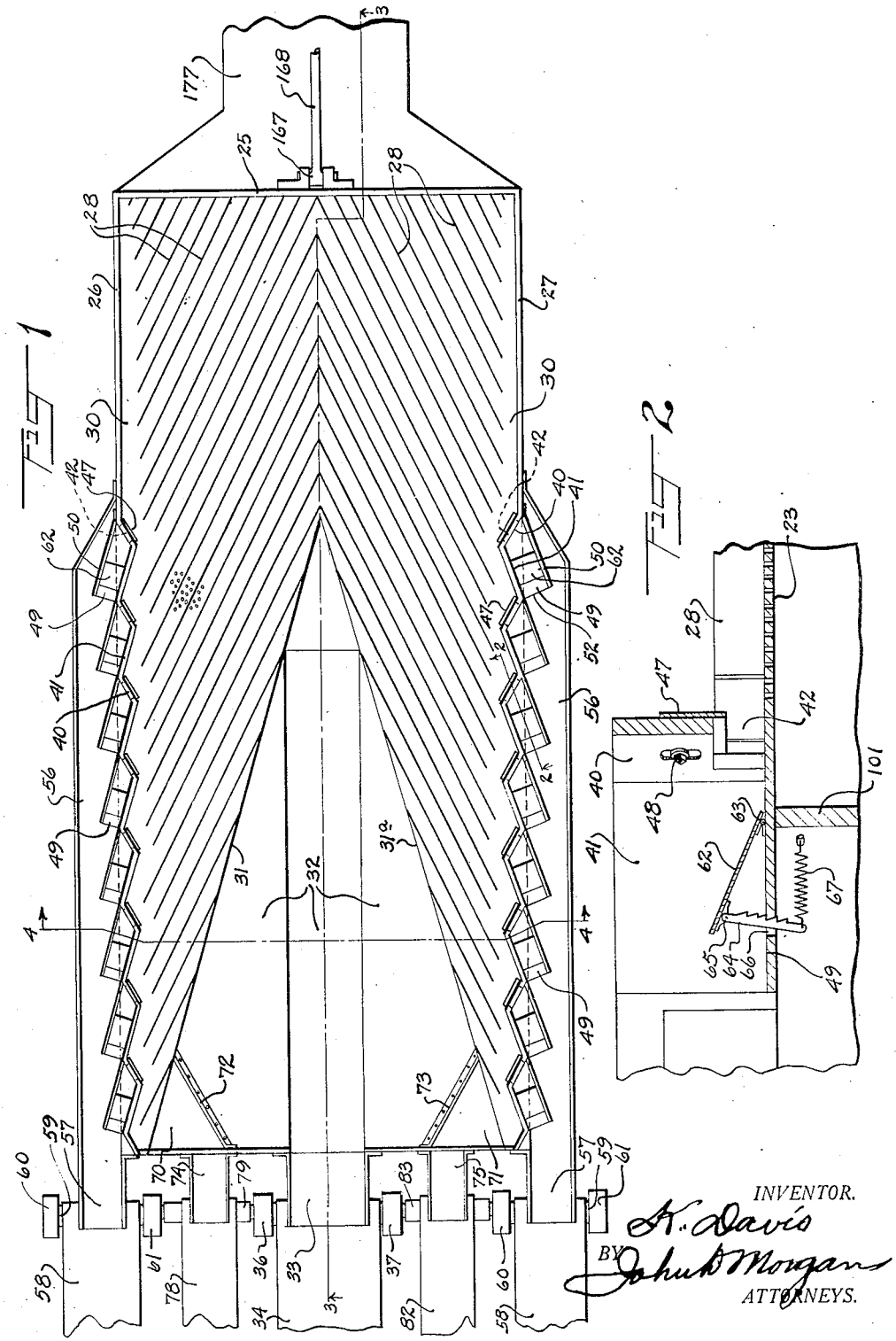

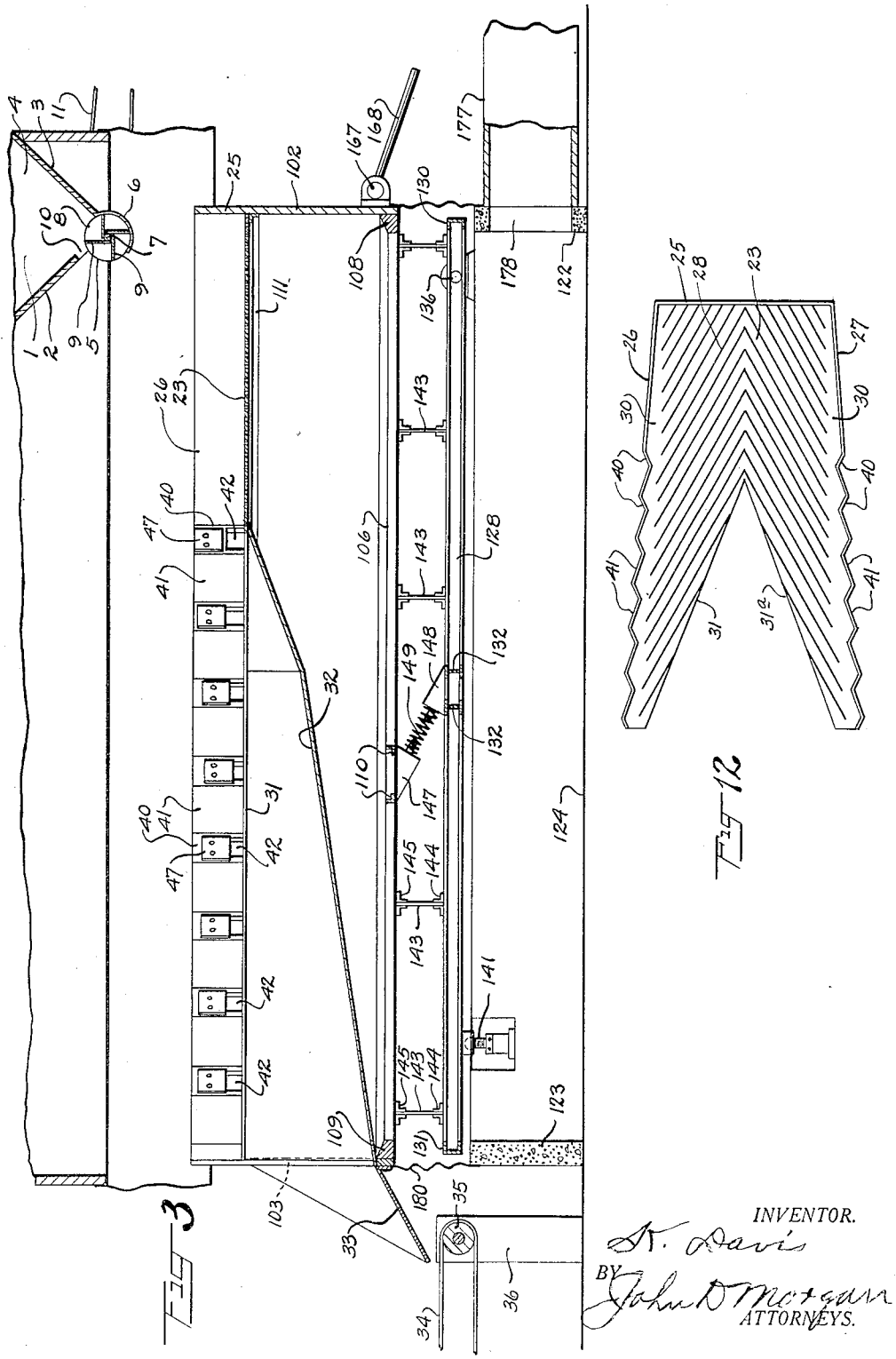

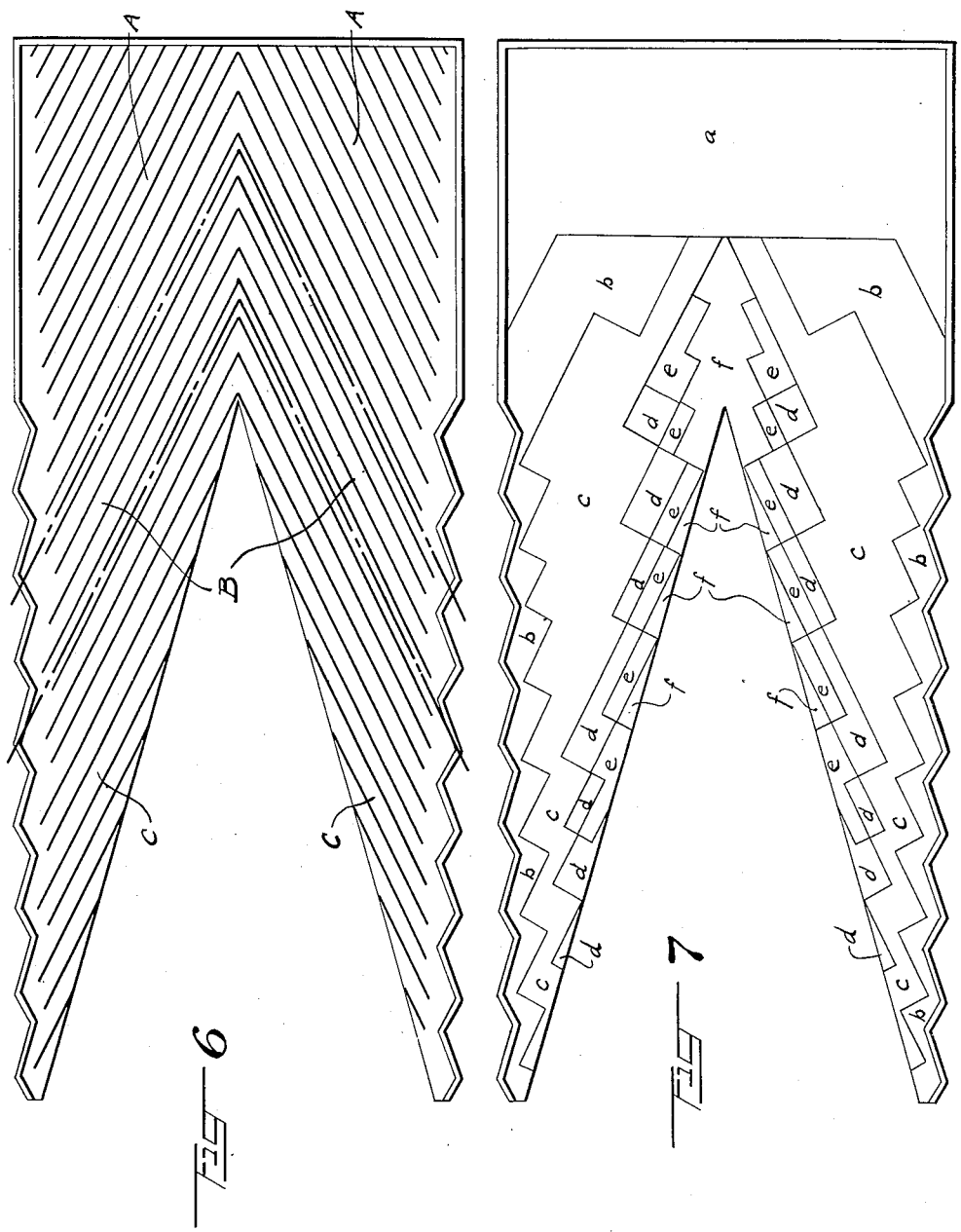

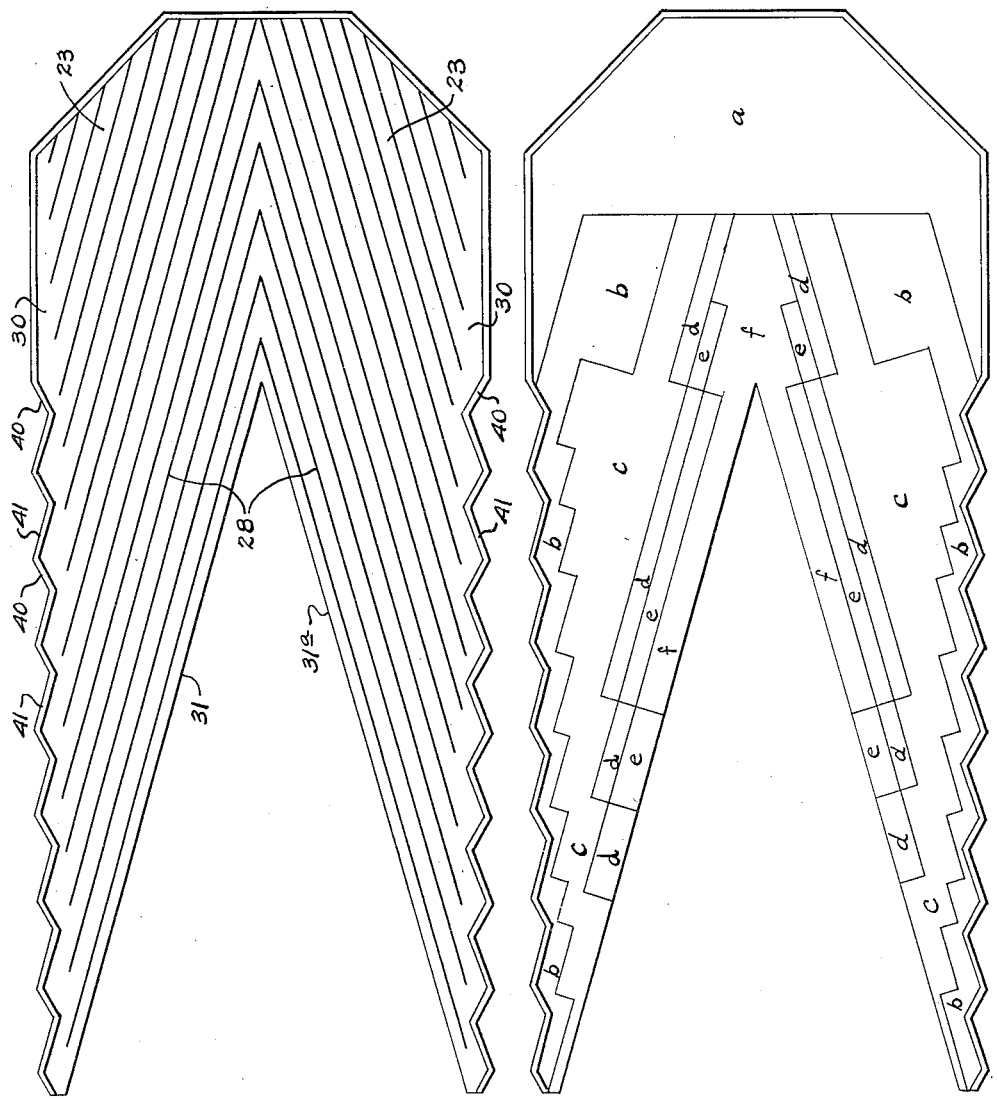

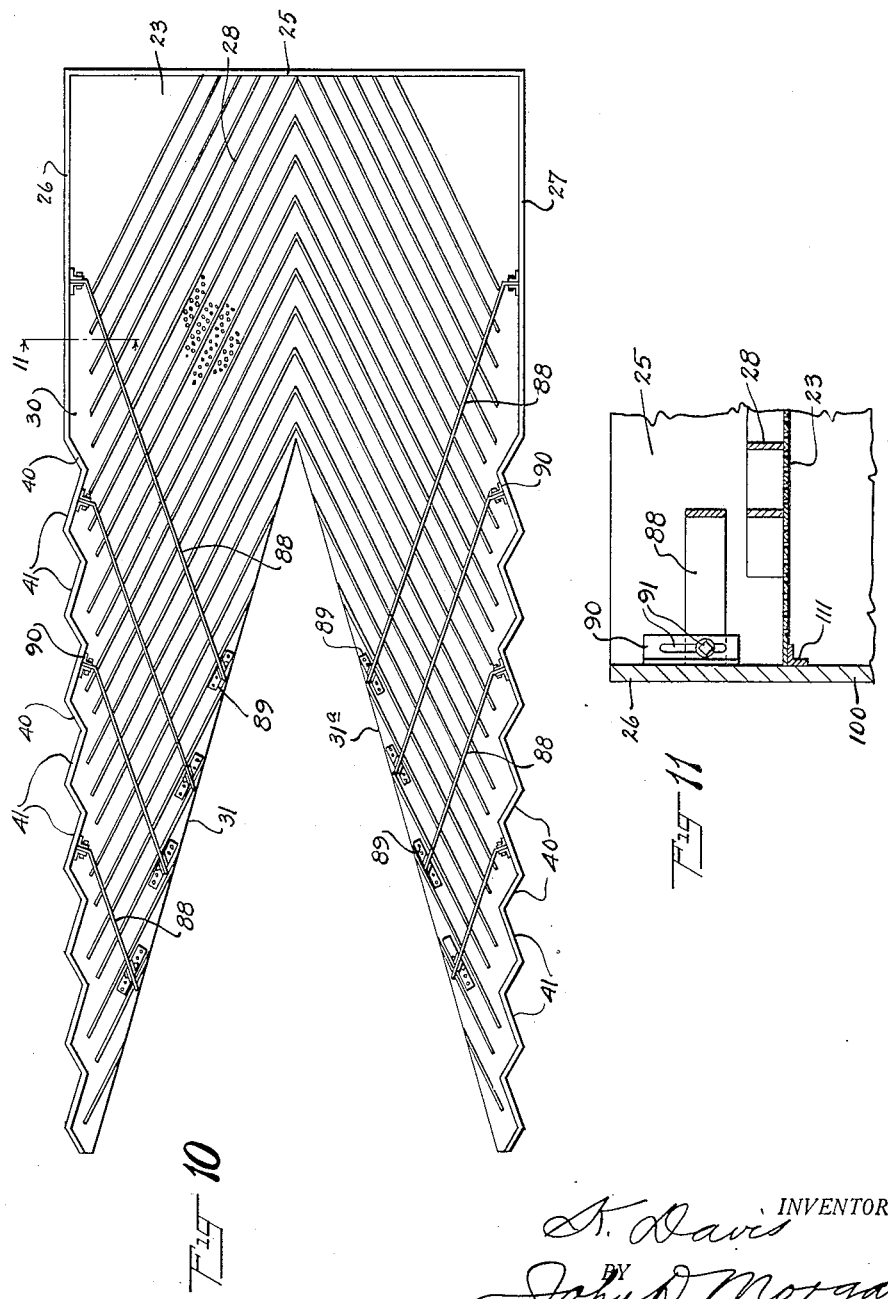

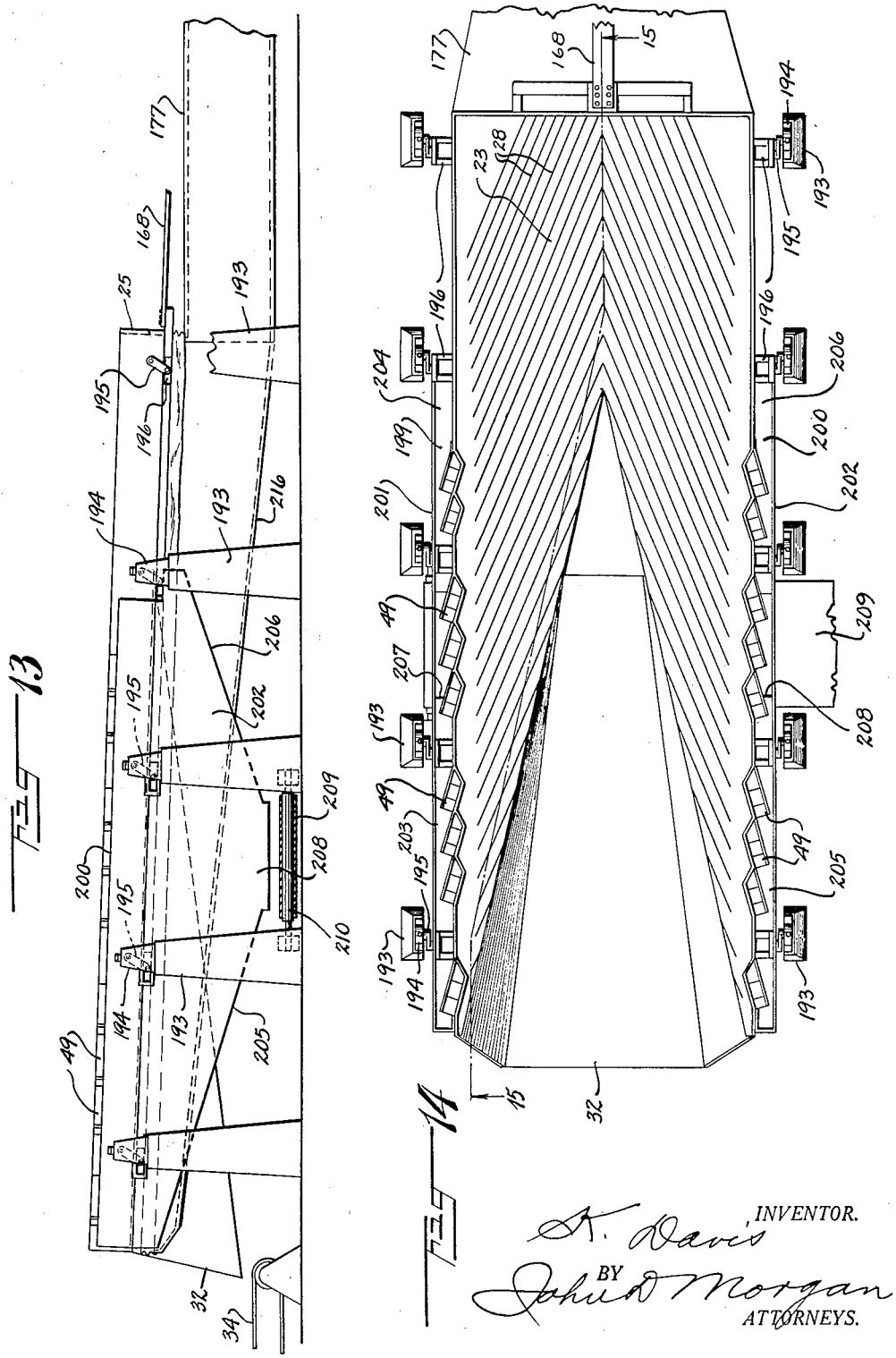

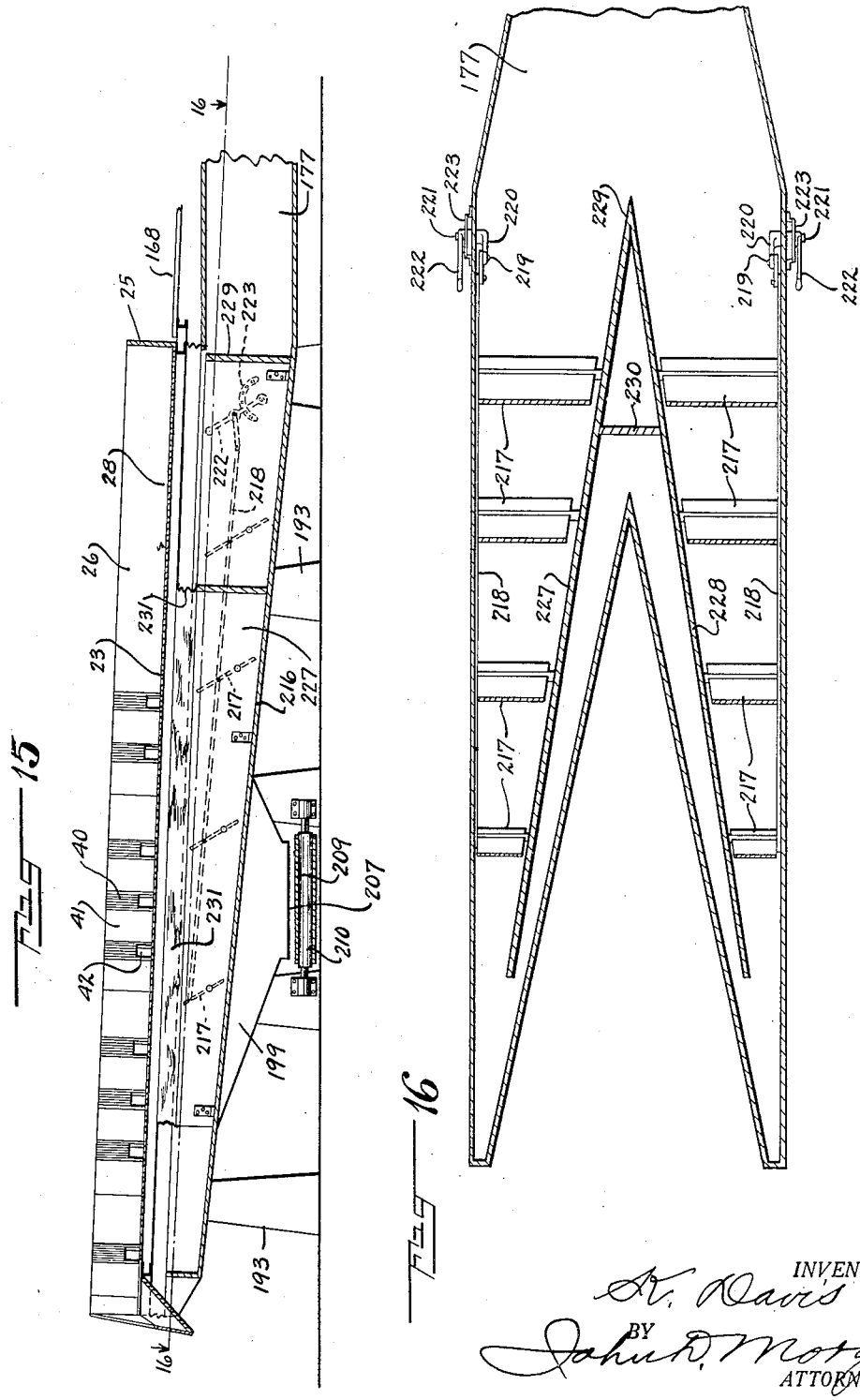

Patented Aug. 4, 1931

1,817,298

UNITED STATES PATENT OFFICE

KENNETH DAVIS, OF EBENSBURG, PENNSYLVANIA, ASSIGNOR, BY MESNE ASSIGNMENTS, TO PEALE-DAVIS COMPANY, OF WILMINGTON, DELAWARE, A CORPORATION OF DELAWARE

PROCESS AND MECHANISM FOR SEPARATING INTERMIXED DIVIDED MATERIALS

Application filed March 11, 1926, Serial No. 93,900. Renewed June 17, 1929.

The invention is directed to a novel and useful process and mechanism for separating intermixed divided materials of different specific gravities; and more particularly to a process and mechanism for separating such materials which vary relatively greatly in the size of the intermixed fragments or particles, while on the other hand, varying relatively little in their specific gravities.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a top plan, with parts broken away, of a mechanism constituting an embodiment of the invention;

Fig. 2 is a fragmentary, vertical, enlarged section on the line 2—2 of Fig. 1;

Fig. 3 is a vertical, longitudinal section taken on the line 3—3 of Fig. 1, with certain parts omitted and others broken away;

Fig. 4 is a vertical, transverse section taken on the line 4—4 of Fig. 1;

Fig. 5 is a diminished side elevation, looking at Fig. 1 from the bottom side, and looking at Fig. 4 from the right, and showing the air pressure mechanism in elevation;

Fig. 5ª is a fragmentary elevation corresponding to Fig. 5 with exterior parts removed;

Fig. 6 is a diagrammatic plan, corresponding to the central part of Fig. 1, and showing the present preferred arrangement, according to heights, of the separating partitions;

Fig. 7 is a diagrammatic plan, corresponding to Fig. 6, omitting the separating partitions, and showing one of the preferred zonings, or relative distribution of areas, of the air pressure;

Fig. 8 is a top plan, partly diagrammatic, of the table alone, and showing another preferred form and arrangement of the separating partitions with respect to the tables;

Fig. 9 is a view similar to Fig. 8, but omitting the separating partitions, and showing the zonings or relative distribution of the areas of different air pressure through the bed of materials;

Fig. 10 is a top plan of the separating table alone, showing a series of directing partitions for inwardly and forwardly directing the superior, lighter, stratified material;

Fig. 11 is an enlarged, fragmentary, vertical section taken on the line 11—11 of Fig. 10;

Fig. 12 is a diagrammatic plan view of another form of table in which the table increases in width forwardly;

Fig. 13 is a fragmentary side elevation showing a somewhat different form of structure;

Fig. 14 is a top plan, corresponding to Fig. 13 with certain parts omitted;

Fig. 15 is a vertical, longitudinal section, substantially on line 15—15 of Fig. 14; and Fig. 16 is a horizontal section, taken substantially on line 16—16 of Fig. 15.

Certain features of the invention claimed in this application, among others, such as a process and mechanism for separating unsized or "run of the mine" materials while effecting a forward flow of a superior stratum of lighter material and for discharging said lighter material at the front of a bed of materials; for effecting a transverse or lateral movement of a settled heavier material and for substantially immediately discharging said material progressively along the side edge of the bed; for regulating the discharge of the heavier material; for varying the lifting air forces along the bed of materials and in the directions of flow of the separating materials; for varying the longitudinal and lateral inclinations of the bed; are disclosed but not claimed in my prior copending application Ser. No. 724,784, filed July 8, 1924; a process and mechanism for effecting a progressive discharge of a superior stratum of of materials; for restraining said stratum from lateral flow; and for leaving a free pathway for the heavier material along the side edge of the bed prior to the discharge of said material; together with the other features above enumerated, are disclosed but not claimed in my prior copending application Ser. No. 39,432, filed June 25, 1925; and a process and mechanism for regulably discharging a settled heavier material at a plurality of loci along the side edge of a bed, together with the other features above enumerated, are disclosed but not claimed in my prior copending application Ser. No. 72,894, filed December 3, 1925.

It will be understood that the process and mechanism are not limited to the double-unit form of table shown and described as the preferred embodiment in the present application, wherein the settled heavier material is discharged at both sides of the table and the lighter material discharges centrally of the table; but that the invention may also be carried out on a single deck unit whereby the settled heavier material is directed to discharge at one side of the table by a single set of parallel separating partitions, while the lighter material flows forwardly to discharge at the front end of the table. A single separating deck embodying the hereinbefore enumerated features is shown and described, but not claimed, in my copending application Ser. No. 39,432, filed June 25, 1925, together with the double unit form, shown constructed as a single table for driving and mechanical convenience.

The invention comprises a novel process and novel mechanism for separating intermixed divided materials, and delivering the different separated materials apart from each other and free from intermixture. The invention is directed more particularly to providing an improved process and mechanism whereby intermixed materials are successfully separated, wherein the fragments or particles of the various materials vary very greatly in size, and wherein the various intermixed materials differ relatively but little in their specific gravities; the rapid and successful commercial separation thereof thus presenting a very difficult problem.

The expression "intermixed divided materials" is used for convenience herein in designating a mixture comprising two or more materials in granular, fragmentary, pulverulent or other like state, whether natural or due to previous handling or operations. The expressions "heavier" and "lighter" as applied to the materials, pertain to relative specific gravities, and are so used for convenience.

An example of such materials, with the mechanical conditions and having the physical properties already described, is a mixture of coal, "bone", and rock and other impurities, as it comes from the mine, and the present invention in actual practice has been chiefly directed to the automatic cleaning of the coal as it comes out of the mine, and without previous preparation or handling.

One of the principal and most valuable features of my process and mechanism is the ability to practically completely separate coal, "bony" and rock without the preliminary "sizing" which has heretofore been necessary, and which constitutes a tremendous, and practically prohibitive, item of labor and expense. By my invention, I am enabled to practically complete the separation of the coal, "bony" and rock, as it comes from the mine, from the finest dust up to pieces three inches in dimensions, by a single operation and by running it in very large volume over merely a single cleaning table, the coal going direct to the cars, and the rock to the rock heap, and the bony being handled in any way desired.

According to previous commercial practice, except by the cleaning tables disclosed in and covered by certain of my copending applications, it has been necessary to very closely size the coal by preliminary screening before attempting the automatic separation of the intermixed coal, bony and rock.

As an example of necessary previous commercial screening preparatory to separating:—All sizes above two inches were screened out; from two inches to 1½ inches were screened as the next size; then from 1½ inches to 1 inch; from 1 inch to ½ inch; from ½ inch to ¼ inch; from ¼ inch to ⅛ inch; from ⅛ inch to $\frac{1}{16}$ inch; and from $\frac{1}{16}$ inch down were screened out on successive screens. Each of these sizes is then sent to a different separating table. Thus seven or eight different screens are required and seven or eight separating tables, one for each different size of the intermixed materials produced by screening, making about fourteen or more machines and operations in all.

By my invention, I dispense with all of the screening mechanisms of the prior art and with all but one of the separating tables. I use only a single large separating table, and over this single table I send the unprepared, unsized, intermixed materials, which prior to my invention were necessarily sent first over the several screening or sizing mechanisms, and then over the corresponding separating tables, as described in the preceding paragraphs. I am able on this one table to practically completely separate the coal, rock and bony and other impurities from three inches in dimension down to the finest dust.

My invention is applied to the separation of a continuous and forwardly flowing bed of the intermixed, divided materials, such as the unsized mixture of coal, bony and rock, the bed of materials undergoing separation being supported upon an air pervious table, through which a blast of air is driven from beneath upwardly through the bed of material, the table at the same time being moved or reciprocated to mechanically forward the separated heavier material, which has settled down upon the table, by friction and inertia toward a place of delivery, the gradation of the force of the air current and the table structure cooperating in the novel manner hereinafter set forth to accomplish the desired result.

My process of separation by stratification is a continuous and progressive process along the continuously maintained bed of materials, the heavier material being diverted practically immediately from the bed in numerous small streams, and the upper stratum of clean, lighter material travels longitudinally forwardly along the table in a single stream. The discharge of this clean, upper stratum of lighter material begins approximately at the central part of the table primarily and from thence forwardly without lateral diversion of this clean, separated upper stratum of lighter material. Thus there is effected a practically immediate discharge of both the lighter and heavier materials, respectively, as soon as the separation thereof is gradually effected, this discharging action of both materials occurring along a great part of the length of the table. The heavier material is discharged laterally in many small streams and the lighter material is discharged inwardly and centrally in a single, forwardly moving continuous stream.

The invention, as embodied, provides broadly for feeding on the material at a locus which is at or near the rear end of the separating table, and preferably entirely across this end, at such rate as to build up at the beginning, and thereafter to continuously maintain, upon the table a bed of materials of substantially uniform thickness, which moves gradually forwardly over the table. The materials undergo a continuous and progressive separation, due to the combined air and mechanical actions, with the cooperation of the mechanical instrumentalities, as they move forwardly, gradually approaching complete separation, which is effected before the separated materials are delivered from the table, the discharge of the separated materials being likewise gradual longitudinally of the table, as already explained.

By my present invention, the intermixed materials of the diverse and difficult character already described, are fed on to the rear end of the air pervious table, and beginning at this time and continuing progressively forwardly along the table, by the air action, and partly by the reciprocation of the table, the intermixed particles or fragments of material are loosened apart and separated from each other, and the lighter material gradually forms a flotant top stratum, and the heavier material gradually settles and comes to rest upon the table, and thereafter is progressed forwardly by the combined action of friction and inertia to a place of delivery, the paths of travel of the separated strata and the manner of discharge thereof, as broadly indicated, cooperating to facilitate practically perfect separation, rapid action, and large output.

Broadly considered, in connection with the foregoing, the process and table of my present invention, in addition to creating this superior flotant stratum of the lighter material, provides also for this stratum traveling forwardly in a straight and unconstrained path and at the end of its straight and unconstrained path to be delivered from the table, beginning substantially centrally of and well back in the length of the table, thereby giving the shortest and most natural path to the superior flotant material.

The heavier material, which is likewise continuously and progressively separated, comes to rest upon the table, is acted on by friction and inertia, and is propelled in numerous small streams to the side of the table as soon as possible, and is then practically immediately discharged at the edge of the table, without interfering or intermixing with the straight and uninterrupted flow of the lighter superior flotant stratum, and also obviating the expenditure of energy in moving it the length of the table and avoiding possibility of remixing of the separated strata.

In connection with the foregoing, the air action is cooperatively proportioned and disposed to produce the completest and most satisfactory result in the difficult task of completely, or practically completely, separating the particles of intermixed material of such widely divergent dimensions and so closely related in relative specific gravity. Accordingly, the area or zone of greatest air activity is at or near the place of feeding on of the intermixed materials, and these zones or gradations decrease substantially forwardly along the table, and also transversely across the table and across the direction of movement of th lighter stratified material.

The foregoing general description and the following detail description are both explanatory and illustrative of the invention, but are not restrictive thereof.

Referring now in detail to the present preferred embodiment, the separating table is adapted to support and progress a bed of materials which is continuously maintained thereon of substantial thickness, the materials being gradually stratified and separated by a single continuous operation.

The feed of the intermixed materials to the rear end of the bed is regulated to maintain the bed continuously of the desired thickness, which usually ranges from five to nine inches of the mixture of coal, rock and other impurities as it comes from the mine, although this may be widely varied.

The means for feeding on the intermixed, divided materials may be of any desired or known form, adapted to feed the materials variably or regulably, at the desired rate, to the table. As embodied, a hopper 1 is provided, having vertical side walls 4, and front and rear walls 2 and 3, which converge downwardly. At the bottom of the hopper is a regulable feeding device 5, shown as comprising a horizontally-disposed parti-cylindrical casing 6. Mounted therein is a horizontally-disposed, driven, rotatable, shaft 7, upon which is fixed a plurality of discs 8. Between the discs 8 are arranged a plurality of horizontally disposed feeding blades 9, with their ends fixed to the discs and in substantially tangential relation to the shaft 7.

The shaft 7 is rotated by any desired form of variable speed drive, and the intermixed materials are thus regulably fed out from the hopper 1 through the opening 10 onto the rear end (the right-hand end in Figs. 1 and 3) of the table. The feed of the materials is preferably substantially entirely across the rear end of the table. In Figs. 8 and 9 a form of table is shown in which the feed of the material is only to a central, but fairly broad space at the rear end of the table.

The table comprises a flat, air-pervious deck 23, of suitable material, whereby a strong current of air may be forced upwardly through the table, and the bed of materials moving thereover, to separate apart from each other the normally compacted or closely-lying particles of the intermixed materials, whereby the particles are rendered freer to move, and the particles of the lighter material are rendered flotant and form a separated upper stratum, and the heavier particles come to rest upon the table and are thereafter forwarded by the action of friction and inertia. To efficiently effect this function, with the particles of the intermixed materials varying widely in the size as already indicated, and with relatively small difference in the specific gravities of the various materials, the force or intensity of the air currents through the various parts of the table is predeterminately selectively varied or gradated, to most efficiently effect the particular kind of stratifying and separating action, and especially the continuous and progressive separating action with the difficult class of material operated upon.

This regulation and distribution, or zoning, of the varying intensity of air current action through the bed is preferably secured by corresponding variations in the degree of perviosity in the bed itself. This may be effected in various ways, but one commercial form is to have the bed constructed of closely joined and abutting metal plates, having perforations therethrough varying in size and number to correspond to the air action desired.

Referring now to the general structure of the table (Figs. 1 to 5), the table or deck 23 is structurally supported by the upper part of the air pressure chamber, the table and upper part of the chamber being longitudinally reciprocable together, while the lower part of the chamber is stationary, with a flexible air-impervious connection therebetween.

The table is provided across its rear end with an upwardly-projecting back-wall 25 to retain the bed of materials on the table, and similar side walls 26 and 27 extend along the side edges of the table and in the preferred form entirely along the side edges. On the top of the air pervious table 23, and projecting upwardly therefrom are a plurality of separating partitions 28. These partitions preferably begin right at the back retaining wall 25, but may, if desired, be spaced forwardly therefrom. The separating partitions 28 are spaced apart, and extend both forwardly and also outwardly toward the side edges of the table, but their outer edges terminate short of the side walls 26 and 27 to provide a longitudinally extending passage 30, just inside the side edge walls of the table, for the heavier separated and stratified material. The table is preferably of uniform width forwardly or of somewhat increasing width progressively forwardly of the table, so as to facilitate the separating action.

The largest pieces of rock, or other heavier material settle immediately upon the table at or very near the place of feeding on the material, and are thereby separated from the mass of material, and are thenceforth progressed immediately to discharge by joint action of friction and inertia. The separating partitions constrain and determine the path of travel of the heavier material at rest upon the table, while the flotant upper stratum of lighter material passes longitudinally forwardly over these partitions. The partitions direct the heavier material immediately outwardly to the side edge of the table, and away from the mass of longitudinally forwardly flowing materials of the bed, the upper part of which consists of already stratified and separated lighter material, and the lower part of which consists of material yet intermixed but rapidly undergoing the process of complete separation.

These actions continue as the lighter material moves in a superior central stream moving directly longitudinally forwardly along the table to discharge at the central and forward part of the table. As the material so moves forward, the smaller and smaller pieces of the heavier material, settle lower and lower in the stratum, and at one point or another, finally sink behind the separating partitions and are immediately directed and constrained to pass, by the action of friction and inertia, in small streams, to the side edges of the table while the overhead stratum moves directly forwardly as already described.

Means are provided by the invention, as already generally indicated, for discharging the coal, or other lighter material interiorly of the table and beginning immediately after, or very soon after, the beginning of the clear stratification and continuing along the interior of the table and forwardly thereof as the stratification progresses forwardly along the bed, the lighter material moving meanwhile directly forwardly along the bed. Further, the end of the table is designed to afford the greatest possible extension of line or edge for the discharge of this lighter and upper flotant stratum of material.

With all this in view, in the preferred form, the forward or front edge of the table is preferably of a general V shape, with the vertex to the rear, and located well backwardly toward the center of the bed, or in some cases farther back. That is, the side edges of the discharge edges of the table are sharply inclined from an initial point approximating more or less the center of the table forwardly and outwardly to the forward ends of the side edges of the table. This provides, as already indicated, an almost immediate discharge for the stratified and separated lighter material as soon as the complete separation is effected for a relatively small portion of the stratum. As the separating action continues progressively along the table and as the upper stratum becomes entirely of the lighter material, it is discharged over the edge of the table immediately in front, the separation continuing gradually to the forward end of the table, and the separated superior stratum of lighter material traveling immediately longitudinally forwardly, and being discharged from the table without any sidewise crowding or deflection.

Means for conveying away the separated and discharged coal or other lighter material are provided of suitable form, and as embodied (Figs. 1, 3 and 4) an inwardly and forwardly inclined chute 32, has its upper edges adjoining with and beneath the discharge edges 31 and 31ª of the table. The chute is inwardly and forwardly inclined, whereby the discharge material will slide down the chute forwardly and inwardly toward the front end thereof. The chute is provided at the central front part thereof with a discharge chute 33, conveniently discharging onto an endless conveyor belt 34, the inner end of which is shown running over a roller 35, which roller is journaled in supports 36 and 37.

In accordance with one feature of the invention, means are provided for discharging from the table the settled and separated rock, or other heavier material, practically as soon as it reaches the side edge of the table, thereby obviating the mechanical effort, and the structure necessary to move a large and concentrated mass of rock, or other heavier material, along the table for a relatively long distance. That is, by my present invention, as soon as the rock or other heavier material settles upon the table, it is immediately conveyed by friction and inertia to the side of the table away from the forwardly-flowing stream of separated lighter material, and from the underneath portion of the forwardly moving bed of materials which is still undergoing separation, and as soon as so conveyed to the side of the table, the rock is discharged immediately from the table.

In the embodied form of said means, a plurality of discharge gates are provided in the side edge walls 26 and 27 of the table, these gates being preferably relatively numerous and being substantially in line with the outer ends of the correspondingly located separating partitions 28. The rearmost of these series of these gates may begin as far back along the side edges of the table as may be found efficient or desirable in any given class of work. One of the embodied forms of these gate mechanisms is shown in enlarged detail in Fig. 2 of the drawings, and a single description will suffice for all of the gates of the two series. As embodied, the corresponding part of the side edge walls 26 and 27 are inclined forwardly and relatively inwardly for a short distance at each gate, as shown at 40 in Fig. 1, and then is inclined forwardly and outwardly again as shown at 41. In each of the portions 40 of the side edge walls is formed an opening 42, in the lower part of the wall and above the airpervious deck, the deck constituting the lower part of the discharge opening. Thus the stream of rock or other heavier material moving forwardly and outwardly behind and between the separating partitions 28, in alinement with the particular opening 42, or which may be coming down the side passageway 30, will pass out through the opening 42 and be discharged from the table.

Means are provided for effecting the discharge of all the heavier separated material and for preventing discharge of any of the lighter stratified material at the various discharge openings 42. As embodied, means are provided for regulating the cross sectional discharge area of the various discharge openings 42, and cooperating therewith, means for regulating the depth of the strata of rock or heavier material with respect to the height of the discharge opening, to guard against discharge of the lighter, superiorly stratified material from the opening. In the embodied form thereof, a vertically-movable slide 47 is slidably supported against the inner face of the portion 40 of the side edge wall, by a pin-and-slot connection 48, which permits the vertical positioning of the slide 47 to be varied as may be desired to regulate the height of the opening 42.

Exteriorly to each of the openings 42 is a discharge passageway 49, to conduct the discharged rock. This passageway has an outer side wall 50, the inner side wall thereof being formed by the part 41 of the table side wall. The exterior edge 52 of this passageway is above a discharge chute 56, fastened to the side wall of the table, and inclined forwardly and downwardly, and having its front end 57 discharging onto an endless conveyor belt 58, the inner end of which runs over a roller 59 mounted in bearings 60 and 61.

As a further part of said means for controlling and safeguarding the discharge of material, there is mounted in each of the passageways 49 a gage-plate 62, hinged at its bottom end 63 to the bottom of the passageway. Devices are provided for supporting these gage plates at any desired inclination, and as shown, a notched bar 64 is pivoted at 65 to the gage-plate, and extends downwardly through an opening 66 in the bottom of the passageway 49. The notched bar 64 is acted on at its lower end by a tension spring 67, which holds the notches in the bar in engagement with the edge of the opening 66, thereby maintaining the gage plate 62 at any desired inclination or height.

Thus by varying the position of the gage plate, the bed of rock or other heavier material may be kept substantially level with, or just above the top edge of the discharge opening 42 in the side wall of the table and thereby all the rock or other heavier material will be discharged, but the lighter material will be prevented from passing out through the opening, and will pass onwardly centrally and longitudinally of the table to the forward, internal place of discharge.

While so far as the invention has been described as separating a heavier and a lighter material from each other, the invention in certain of its relation or features is adapted to separate also a material of intermediate specific gravity, as well as the lighter and heavier materials. In the embodied form, (Fig. 1), the table is shown adapted to separate intermediate material, and in such embodied form the immediate forward ends of the table, just within the side edge walls 26 and 27, and along the forward ends of the discharge edges 31 and 31ª, are provided with discharge passageways 70 and 71, for an intermediate material such as "bony" which is often found in coal as it comes from the mine. Each of these passageways is separated from the chute for the coal or other lighter materials by respective partitions or baffles 72 and 73, these partitions being movable along the discharge edges 31 and 31ª, to separate out more or less of an intermediate product as may be desired. These passageways, respectively, are provided with discharge chutes 74 and 75. The discharge chute 74 empties onto an endless belt 78, which runs over a roller 79, which is conveniently journaled in the bearings 36 and 61. The discharge chute 75 likewise delivers to an endless conveyor belt 82, running over a roller 83, similarly conveniently journaled in bearings 37 and 60.

By regulating the intensity of the air currents, and the relative action thereof in the various parts of the bed, and by properly positioning the baffles or dividing plates 72 and 73, the "bony" or other intermediate product may be separated to any required degree of nicety from the rock or other heavier material and from the coal or other lighter material. These factors may be changed or modified to meet the needs of the particular materials being operated upon, or the physical state or conditions of such materials.

In accordance with one feature of the invention, the separating partitions are provided of different heights for different areas of the table, and in this respect they are designed or regulated so as to secure the continuous but graduated or progressive separation of the materials in the bed as it moves forwardly along the table. As embodied, and as shown in Fig. 6, areas A of relatively greatest height are provided and areas B of relatively intermediate height, and areas C of least height are shown, although it will be understood that the height may be varied otherwise, as may be found desirable or efficient or convenient, in separating various kinds and conditions of intermixed materials.

In Fig. 7 is shown diagrammatically an arrangement of different air pressure zonings or gradations, the areas of great air-pressure action being indicated by a and in decreasing degree to f, which represents the areas or zones of least air-pressure action. The gradations may change by definite areas or by more gradual changes, as found desirable or expedient. In this embodiment, and as found most effective for certain kinds of separating work, the air-pressure action is greatest at the rear of the table and the side-edge walls thereof, and decreases both forwardly along the table and also inwardly toward the central and internal discharge for the upper stratum of separated lighter material. The separating partitions are omitted in this view to more clearly show the zonings, but the partitions may be arranged as shown in Fig. 6 or in the other views or otherwise, as may be found most efficient with any particular kind of work.

In Fig. 8 there is shown more or less diagrammatically a different shape and arrangement of the table and of the separating partitions. In this form, the material is fed onto only a fairly wide central portion of the rear end of the table. The separating partitions are inclined forwardly and outwardly preferably parallel, or substantially parallel, with the central and internal discharge edge of the table for the lighter stratified material. If desired, gradations in the heights of the separating partitions, as diagrammatically illustrated in Fig. 6, or any other arrangement of gradations, may be employed, as found convenient or desirable. The separating partitions may be of various heights along or in different parts of the table, an example of one such arrangement being shown in Fig. 6.

In Fig. 9 there is shown a somewhat different arrangement of the air pressure zoning which with certain classes of material will be found highly efficient with the form of table just described. The separating partitions are omitted from this figure, for the sake of clearness in showing the zoning. The arrangements of Figs. 8 and 9 may be used together, or other arrangements could be used with either, as might be found most advantageous under particular conditions and with certain materials. The area of greatest air-pressure action is indicated by $a$ and by the successive letters decreasingly to $f$, which indicates the areas of least air-pressure action. The general discussion as to Fig. 7 is applicable to this exemplary arrangement also.

In accordance with one feature of the invention Figs. 10 and 11, there are provided auxiliary devices for directing the stratified and separated upper layer of lighter material from its direct forward path inwardly toward the central and internal discharge edges of the table. As embodied, a plurality of guiding and deflecting strips 88 are provided above the separating partitions, these strips extending forwardly and inwardly from the outer side edge walls 26 and 27, their inner ends terminating at or contiguous to the internal discharge edge for the separated lighter material.

The strips 88 are vertically variably positionable as may be desired or required for most efficient separation. As embodied, for this purpose, the interior ends of the strips 88 are mounted on and supported by standards 89, which in turn are fixed to and project upwardly from the top of the table 1 near the internal discharge edges, respectively. At their outer ends the strips 88 are likewise supported by standards 90, fixed to the side edge walls 26 and 27 of the table. The strips 88 at either end thereof are supported upon their standards by means of bolt-and-slot mountings 91, whereby the strips may be raised and lowered vertically, and positioned relatively to the table top, and to the tops of the separating partitions, so as to direct inwardly to the discharge edge only that upper part of the bed which has been stratified into a pure stratum of the lighter material, which is thereby immediately discharged from the table into the discharge chute. The two ends of each of the deflecting and directing strips 88 may also be raised or lowered independently for the purposes already described, to vary the action of the strips transversely of the table.

Referring now to the general structure of the table, and to that portion of the air-pressure chamber upon which the table is directly supported, this structure is mounted to permit longitudinal reciprocation, to effect, or to participate in, the progression and discharge of the heavier separated material which is at rest upon the table. As embodied, this portion of the air chamber has side walls 100 and 101, and end walls 102 and 103, these walls at their lower edges being fixed to and supported by side frame members 106 and 107, and end frame members 108 and 109, the frame members being connected together into an integral frame. There are also preferably a plurality of cross bracing and tying frame members 110.

The table 23 is supported upon this structure in a suitable manner, preferably resting upon the top edges of the side walls of the air chamber, and supported also by a plurality of supporting beams or members 111, which may be arranged in any suitable manner to effect the proper support of the table. The lower or stationary part of the air chamber, as embodied, comprises side walls 120 and 121 and end walls 122 and 123, built upon the ground or support 124, and conforming in shape with the upper part of the air chamber. This structure may be of concrete or other suitable material.

The supporting means for the reciprocable upper portion of the air chamber, upon this stationary lower portion thereof, has associated therewith means for variably inclining the table and upper part of the air chamber so as to vary the inclination of the table between the front and rear thereof respectively. In the embodied form of such means, a frame is provided having side reaches 128 and 129, and end reaches 130 and 131, and having one or more cross bracing or tying members 132. As embodied, the side reaches of this frame have at the rear ends thereof, pivotal mountings 136 and 137 upon the top of the respective stationary side walls 120 and 121. At or near the forward end of the side members 128 and 129 of this frame, are ball-and-socket bearings, supported, respectively, upon screw pillars 141, whereby the forward end of the frame may be raised or lowered as desired by means of the screw pillars.

The embodied form of mounting of the upper part of the air chamber and of the table to permit the longitudinal reciprocating action comprises a plurality of upwardly-extending, flexible supports 143, positioned in spaced relation along both sides of the structure, and extending upwardly therefrom. The lower ends of these members have supports 144, which are fixed to the top faces of the inclinable side frame members 128 and 129. The supports 143 have at their top ends attachments 145, which are fixed to the underside of the side frame members 106 and 107 of the upper part of the air chamber. By reason of the flexible character of these members, the upper parts of the air chamber and the table may be longitudinally reciprocable in a limited path, and have a tendency to resiliently return to a given position.

In connection with this mounting, cushioning means are provided to modify the table stroke, and as embodied, a plurality of such devices are provided. These devices, as embodied, comprise a block 147, fixed to the under side of a side frame member of the upper part of the air chamber, and a block 148, fixed to the top side of the corresponding tiltable frame member, a helical spring 149 being in compression therebetween.

The actuating means for the reciprocable table may be of any suitable or desired form, so far as concerns many aspects of the invention. As embodied, a connecting rod 168 is pivotally connected at 167 to the rear end of the upper portion of the air chamber, and at the other end thereof it is pivotally connected to a crank disc 169. The shaft of the crank disc is driven through suitable power-transmitting and speed-reducing mechanism 170, likewise of any suitable form, from a motor or other source of power 171.

In the present preferred embodiment of the invention, the means for producing the air blast comprises a blowing fan 175, a conduit 177 extending from the fan housing 176 to an aperture 178 in the rear wall 122 of the stationary part of the air chamber. This mechanism is shown in more or less general form, and may be constructed in detail in accordance with the best practice for the ends desired.

An air-tight flexible envelope 180 is provided between the stationary and reciprocable parts of the air chamber, the lower edge thereof being fastened air-tight to the upper edges of the wall structure of the stationary part of the air chamber, and the upper edges thereof being attached in like manner to the lower edges of the reciprocable part of the air chamber.

In Fig. 5ª the flexible supports 143 are shown inclined backwardly and downwardly, so that the reciprocatory movement of the table is upwardly and forwardly in one direction and backwardly and downwardly in the other. In many instances, and with certain kinds of intermixed materials, this movement will be found highly efficient in facilitating the separating action; although so far as concerns many features of the invention, the movement may be varied in different ways.

In Figs. 13 to 16 is shown a modified form or embodiment of the table, which is highly efficient for separating certain kinds and conditions of intermixed materials. In these figures, the general features of the table are the same as in the preceding figures, but the mounting of the table, the arrangement of the side discharging chutes, the bottom of the air chamber, are of different form, and additional air-controlling means are likewise provided.

The table is shown suspended from a plurality of spaced-apart supports arranged at either side of the table. These comprise, respectively, supports 193, extending upwardly from the floor, and supported on these, respectively, are a plurality of pillars 194, these being arranged in pairs transversely of the table. Each of the pillars 194 is pivotally connected to the upper end of a suspending link 195, which link at its lower end is pivotally connected to one end of a transverse frame member 196, constituting a part of the reciprocable table frame and support. A like suspending link 195 is pivoted to the other end of cross-frame 196. This mechanism may be substantially the same, or similar to that shown in my copending application Serial Number 39,432 filed June 25, 1925, and may be provided with the various adjustments shown and described in my said copending application.

In connection with this form of reciprocable and adjustable suspension for the table, a different form of collecting and discharging chutes for the side discharges for the rock or other heavier material are also preferably provided. As embodied, a long narrow chute 199 is provided at one side of the table, and a like chute 200 at the other side of the table. These chutes are arranged to receive the discharge from the various rock discharging spouts 49 on the corresponding sides of the table.

The chutes at the top edges of their inner walls are fastened to the machine frame, and the outer walls 201, 202, respectively, of the chutes are located a short distance outside of the rock discharging spouts 49, so as to give clearance for the rock dropping into the chute. The entire chute structure is likewise partially supported by the cross frame members 196.

The outer walls 201 and 202, respectively, of the chutes are preferably substantially vertical, but the end walls 203 and 204 of chute 199, and 205 and 206 of chute 200, are inclined downwardly and toward each other, there being, respectively, central discharge orifices for the chutes at 207 and 208. Beneath these discharge orifices is a transversely-disposed endless conveyor belt 209, running over guiding and driving rollers 210, to convey away the rock or other heavier material.

In Figs. 15 and 16 the stationary part of the air chamber is shown of decreasing transverse cross-section gradually forwardly of the table, for the purpose of controlling the intensity of air pressure. For this purpose the bottom 216 of the air-chamber is upwardly and forwardly inclined. By such decrease forwardly in the cross-section, and consequently the volume, of the air-chamber, a greater relative pressure may be maintained in the forward end of the table. This feature, however, may be combined with other features of the air-control structure and devices to vary the relative intensity of the air-pressure in various parts of the table as may be found desirable and efficient for different kinds of intermixed materials, or for such materials in different physical conditions.

Either in conjunction with, or separately from the features of the air chamber just described, a plurality of air baffle plates 217 are provided at various locations longitudinally of the air chamber, which baffle plates may be of different sizes, or may be inclined at varying angles, or varying relative angles, to direct a portion of the air current upwardly toward the table. In the embodied form, a single mechanism is shown at either side, that is, in either branch of the air chamber, for variably positioning these baffle plates 217.

In said embodied form, each of the baffle plates is pivotally connected to a longitudinally-disposed rod 218, at various points therealong, and the rod in turn is pivotally connected, at its rear end 219, to a lever arm 220. Lever arm 220 is fixed to a shaft 221, journaled in the side wall of the air chamber, and a hand lever 222 is fixed to the shaft on the end thereof which is exterior of the air chamber side-wall. A locking segment 223 is provided to hold the lever in any position.

If it is desired to further relatively vary the air action in different places along the air chamber, this can be done by moving any one or more of the baffle plates 217 relatively to the positioning and actuating rod 218. There is preferably a similar system of baffles and actuating means at either side of the chamber and a single description will suffice therefor.

Means are optionally provided for markedly varying the air pressure in certain areas of the table, as may be found desirable, by using fixed partitions alone or in conjunction with the baffles or other movable air-current controlling members. In the present embodiment, partitions are arranged to give an area of markedly less air-current intensity along and near the discharge loci for the lighter materials. In Figs. 15 and 16 an embodiment of such an arrangement of air-current-control devices is shown, comprising a pair of walls 227 and 228, respectively, fixed to and extending upwardly from the floor of the air chamber, and converging rearwardly in the air chamber, approximately paralleling the discharge edge for the lighter material, and meeting at a point 229. A cross bulk-head 230 is arranged within and between the two walls 227 and 228. A flexible air-impervious member 231 connects the top edges of the walls 227 and 228 to the underside of the table to form an air-impervious partition while permitting the table to vibrate. A similar flexible air-impervious member connects the top edge of bulk-head 230 to the underside of the table.

Such an arrangement or construction, when employed, serves to decrease the air pressure or air current action immediately within and along the discharge edge for the lighter material, which will be found very advantageous in many instances. It will be understood, however, that changes in the position and arrangement of these parts may be made to otherwise vary the relative intensity of the air action in different parts of the table.

From all the foregoing it will be understood that a mechanism has been provided constituting an exemplary embodiment of the invention, and realizing the objects and advantages herein set forth, together with other objects and advantages. It will be understood further that departures may be made from the exact mechanism as shown and described, within the scope of the accompanying claims, without departing from the principles of the invention and without sacrificing its chief advantages.

What I claim is:—

1. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, and directing the settled heavier material by friction and inertia transversely of the forward movement of the flotant material and directly to a place of discharge at the side of the table.

2. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly and upwardly in a laterally restrained stream straight throughout the length of said table to a place of discharge at the front of said table, and directing the settled heavier material by friction and inertia transversely of the forward movement of the flotant material and directly to a place of discharge at the side of the table.

3. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly against gravity in a laterally restrained stream straight throughout the length of said table to a place of discharge at the front of said table, directing the settled heavier material by friction and inertia transversely of the forward movement of the flotant material and directly to a place of discharge at the side of the table, and selectively varying the gravital opposition to the movement of the lighter material.

4. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibrations to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, directing the settled heavier material by friction and inertia transversely of the forward movement of the flotant material and directly to a place of discharge at the side of the table, and subjecting the bed of materials to different air-lifting forces at different parts of the table.

5. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, directing the settled heavier material by friction and inertia transversely of the forward movement of the flotant material and directly to a place of discharge at the side of the table, and subjecting the bed of materials to different air lifting forces longitudinally of the table.

6. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, directing the settled heavier material by friction and inertia transversely of the forward movement of the flotant material and directly to a place of discharge at the side of the table, and decreasing the air lifting forces forwardly along the table in a series of zones of gradated lifting force.

7. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, directing the settled heavier material by friction and inertia transversely of the forward movement of the flotant material and directly to a place of discharge at the side of the table, and progressively discharging said lighter material at the front of the table.

8. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, directing the settled heavier material by friction and inertia transversely of the forward movement of the flotant material and directly to a place of discharge at the side of the table, progressively discharging the heavier material at points along the side of the table as said heavier material settles from the forwardly-moving bed, and progressively discharging the forwardly moving lighter material at the front of the table.

9. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, directing the settled heavier material by friction and inertia transversely of the forward movement of the flotant material and directly to a place of discharge at the side of the table, and regulating the discharge of said heavier material.

10. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, directing the settled heavier material by friction and inertia transversely of the forward movement of the flotant material and directly to a place of discharge at the side of the table, and preventing lateral discharge of lighter material therewith.

11. The process of separating intermixed divided materials wherein the particles vary relatively greatly in size but relatively little in specific gravity, such as unsized coal, which comprises maintaining a substantially deep bed of said materials in progression along an air-pervious table, imparting longitudinal reciprocatory impulses to the bed and passing lifting and loosening air currents upwardly through the bed whereby the bed gradually stratifies, the light material floating and the heavier material gradually and progressively sinking to the bottom of the bed, progressing the lighter material in a continuous, flotant stratum forwardly substantially in the line of reciprocation to discharge along the front of the bed, impelling the heavier material laterally as soon as it sinks to the table to discharge in a plurality of individual streams along the side edge of the bed, and controlling the sinking of the heavy material by causing said material to settle according to an approximate size classification forwardly along the bed and separately discharging the different sizes along the side of the bed.

12. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table at different parts thereof according to an approximate size classification, impelling the lighter, superior, stratified material, solely by intermittent mechanical impulses, directly forwardly in a laterally restrained stream straight throughout the length of said table to a place of discharge at the front of said table, and directing the settled heavier material by friction and inertia transversely of the forward movement of the flotant material and directly to a place of discharge at the side of the table.

13. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, causing different size ranges of said heavier materials to settle sequentially to the support beneath the forwardly moving flotant stratum and directing the settled heavier material by friction and inertia transversely of the forward movement of the flotant material and directly to a place of discharge at the side of the table.

14. The process of separating intermixed divided materials wherein the particles vary relatively greatly in size but relatively little in specific gravity, such as unsized coal, which comprises maintaining a substantially deep bed of said materials in progression along an air-pervious table, imparting longitudinal reciprocatory impulses to the bed and passing lifting and loosening air currents upwardly through the bed whereby the bed gradually stratifies, the light material floating and the heavier material gradually and progressively sinking to the bottom of the bed, progressing the lighter material in a continuous, flotant stratum forwardly substantially in the line of reciprocation to discharge along the front of the bed, impelling the heavier material laterally as soon as it sinks to the bottom of the bed to discharge in a plurality of individual streams along the side edge of the bed, and causing the heavier material to settle substantially sequentially in order of decreasing size forwardly along the bed.

15. The process of separating intermixed divided materials wherein the particles vary relatively greatly in size but relatively little in specific gravity, such as unsized coal, which comprises maintaining a substantially deep bed of said materials in progression along an air-pervious table, imparting longitudinal reciprocatory impulses to the bed and passing lifting and loosening air currents upwardly through the bed whereby the bed gradually stratifies, the light material floating and the heavier material gradually and progressively sinking to the bottom of the bed, progressing the lighter material in a continuous, flotant stratum forwardly substantially in the line of reciprocation to discharge along the front of the bed, impelling the heavier material laterally as soon as it sinks to the table to discharge in a plurality of individual streams along the side edge of the table and causing the heavier material to settle substantially sequentially in order of decreasing size forwardly along the bed by gradually, continuously and progressively decreasing the lifting and loosening action of the air currents forwardly along the bed.

16. The process of purifying coal which comprises subjecting a substantially thick mass thereof, containing in intermixture relatively fine particles and large pieces such as are present in mine coal which has not been subjected to close preliminary size classification, to a pneumatic separating action, thereby causing the larger pieces of the heavier component to rapidly settle to an inferior stratum while the smaller heavy particles remain flotant and intermixed with the relatively thick mass of flotant coal, separately delivering said large heavy pieces from the mass, thereafter delivering a relatively pure portion of the coal from the mass, and then subjecting the residual mass to further pneumatic separating action to cause the fine intermixed heavy particles to stratify, and separately delivering the fine heavy particles and the remaining coal.

17. The process of purifying coal which comprises subjecting a substantially thick mass thereof, containing in intermixture relatively fine particles and large pieces such as are present in mine coal which has not been subjected to close preliminary size classification, to a pneumatic separating action, thereby causing the larger pieces of the heavier component to rapidly settle to an inferior stratum while the smaller heavy particles remain flotant and intermixed with the relatively thick mass of flotant coal, separately delivering said large heavy pieces from the mass, thereafter delivering a relatively pure portion of the coal from the mass, and then subjecting the residual mass to further pneumatic separating action at a reduced air force to cause the fine intermixed heavy particles to stratify, and separately delivering the fine heavy particles and the remaining coal.

18. The process of purifying coal which comprises subjecting a substantially deep mass of raw coal, which has not been closely pre-sized and including in intermixture fine particles and relatively large pieces, to vibration and lifting and loosening air currents whereby the mass gradually stratifies, the lighter material floating and progressing freely and the heavier material gradually and progressively sinking to an inferior stratum, causing the bulk of the larger pieces of heavier material to settle to the inferior stratum early in the process and discharging said large heavy pieces from the mass as a separate product, delivering a portion of the flotant lighter material from the mass, and subjecting the remaining portion of the mass to further air action and vibration to cause the finer particles of heavier material to sink, and separately discharging the fine settled heavier material and the residual coal.

19. The process of purifying coal which comprises subjecting a mass thereof, containing in intermixture relatively fine particles and large pieces such as are present in mine coal which has not been closely pre-sized, to a pneumatic separating action and thereby separating the mass into two parts, one comprising the larger pieces of the heavier component, delivering said large heavy pieces as a separate product, delivering a portion of the lighter component from the mass as a substantially purified product, thereafter subjecting the residual portion of the mass to further pneumatic separating action and thereby separating the fine particles of the heavier material from the mass, and separately delivering the residual purified coal and the fine heavy particles.

20. The process of purifying coal which comprises subjecting a mass thereof, containing in intermixture relatively fine particles and large pieces such as are present in mine coal which has not been closely pre-sized, to a pneumatic separating action and regulating the air action to cause the larger pieces of the heavier material to settle from the mass, delivering said larger pieces of heavier material as a separate product, delivering a portion of the lighter material from the mass as a substantially purified product, thereafter subjecting the residual portion of the mass to further pneumatic separating action wherein the air action is regulated to effect settling of the finer particles of the heavier material, and separately delivering the fine heavy particles and the residuum of the lighter material.

21. A mechanism for separating intermixed divided materials varying relatively greatly in size and relatively little in their specific gravities, such as unsized coal, including in combination an air-pervious table, means for maintaining thereon a bed of the intermixed materials of substantial depth, means for forcing lifting air currents upwardly through the bed to aid in loosening and stratifying the particles by floating the lighter materials while permitting the heavier materials to settle upon the table, devices for reciprocating the table longitudinally comprising the sole force for impelling the lighter, superior, stratified material directly forwardly throughout the length of said table to a place of discharge at the front of said table, means for laterally confining said forwardly-flowing flotant material, and means for directing the settled heavier material by friction and inertia transversely of the table and directly to a place of discharge at the side of the table.

22. A mechanism for separating intermixed divided materials varying relatively greatly in size and relatively little in their specific gravities, such as unsized coal, including in combination an air-pervious table, inclined upwardly toward the front end thereof, means for maintaining thereon a bed of the intermixed materials of substantial depth, means for forcing lifting air currents upwardly through the bed to aid in loosening and stratifying the particles by floating the lighter materials while permitting the heavier materials to settle upon the table, devices for reciprocating the table longitudinally comprising the sole force for impelling the lighter, superior, stratified material directly forwardly throughout the length of said table to a place of discharge at the front of said table, means for laterally confining said forwardly-flowing flotant material, and means for directing the settled heavier material by friction and inertia transversely of the table and directly to a place of discharge at the side of the table.

23. A mechanism for separating intermixed divided materials varying relatively greatly in size and relatively little in their specific gravities, such as unsized coal, including in combination an air-pervious table, inclined upwardly toward the front end thereof, means for maintaining thereon a bed of the intermixed materials of substantial depth, means for forcing lifting air currents upwardly through the bed to aid in loosening and stratifying the particles by floating the lighter materials while permitting the heavier materials to settle upon the table, devices for reciprocating the table longitudinally providing the sole force for impelling the lighter, superior, stratified material directly forwardly throughout the length of said table to a place of discharge at the front of said table, means for laterally confining said forwardly-flowing flotant material, means for directing the settled heavier material by friction and inertia transversely of the table and directly to a place of discharge at the side of the table, and means for varying the longitudinal inclination of the table.

24. A mechanism for separating intermixed divided materials varying relatively greatly in size and relatively little in their specific gravities, such as unsized coal, including in combination an air-pervious table, means for maintaining thereon a bed of the intermixed materials of substantial depth, means for forcing lifting air currents upwardly through the bed in different amounts at different parts thereof to aid in loosening and stratifying the particles by floating the lighter materials while permitting the heavier materials to settle upon the table, devices for reciprocating the table longitudinally comprising the sole force for impelling the lighter, superior, stratified material directly forwardly throughout the length of said table to a place of discharge at the front of said table, means for laterally confining said forwardly-flowing flotant material, and means for directing the settled heavier material by friction and inertia transversely of the table and directly to a place of discharge at the side of the table.

25. A mechanism for separating intermixed divided materials varying relatively greatly in size and relatively little in their specific gravities, such as unsized coal, including in combination an air-pervious table, means for maintaining thereon a bed of the intermixed materials of substantial depth, means for forcing lifting air currents upwardly through the bed to aid in loosening and stratifying the particles by floating the lighter materials while permitting the heavier materials to settle upon the table, devices for reciprocating the table longitudinally comprising the sole force for impelling the lighter, superior, stratified material directly forwardly throughout the length of said table to a place of discharge at the front of said table, means for laterally confining said forwardly-flowing flotant material, means for directing the settled heavier material by friction and inertia transversely of the table and directly to a place of discharge at the side of the table, and means for varying the lifting air forces longitudinally of the table.

26. A mechanism for separating intermixed divided materials varying relatively greatly in size and relatively little in their specfic gravities, such as unsized coal, including in combination an air-pervious table, means for maintaining thereon a bed of the intermixed materials of substantial depth, means for forcing lifting air currents upwardly through the bed to aid in loosening and stratifying the particles by floating the lighter materials while permitting the heavier materials to settle upon the table, devices for reciprocating the table longitudinally comprising the sole force for impelling the lighter, superior, stratified material directly forwardly throughout the length of said table to a place of discharge at the front of said table, means for laterally confining said forwardly-flowing flotant material, means for directing the settled heavier material by friction and inertia transversely of the table and directly to a place of discharge at the side of the table, the perviosity of the table varying longitudinally thereof in a gradated series of zones.

27. A mechanism for separating intermixed divided materials varying relatively greatly in size and relatively little in their specific gravities, such as unsized coal, including in combination an air-pervious table, means for maintaining thereon a bed of the intermixed materials of substantial depth, means for forcing lifting air currents upwardly through the bed to aid in loosening and stratifying the particles by floating the lighter materials while permitting the heavier materials to settle upon the table, devices for reciprocating the table longitudinally comprising the sole force for impelling the lighter, superior, stratified material directly forwardly throughout the length of said table to a place of discharge at the front of said table, means comprising side walls of substantial height extending substantially throughout the length of the table for laterally confining said forwardly-flowing flotant material, and means for directing the settled heavier material by friction and inertia transversely of the table and directly to a place of discharge at the side of the table.

28. In a mechanism for separating intermixed divided materials varying relatively greatly in size and relativey little in their specific gravities, such as unsized coal, the combination of a longitudinally reciprocable, air pervious table provided with means for stratifying and separating a substantially deep and continuous bed of the materials by lifting air currents and mechanical vibration, means for progressing substantially all the lighter material in a laterally-confined, flotant stratum directly forwardly throughout the length of the table to discharge at the front thereof, and means for directing settled heavier material transversely to discharge at the side of the table, and means for progressively discharging the forwardly moving flotant stratum substantially proportionately according to the purification thereof, comprising a front discharge edge disposed obliquely to the forward movement of the flotant stratum.

29. In a mechanism for separating intermixed divided materials varying relatively greatly in size and relatively little in their specific gravities, such as unsized coal, the combination of a longitudinally reciprocable, air pervious table provided with means for stratifying and separating a substantially deep and continuous bed of the materials by lifting air currents and mechanical vibration, means for progressing substantially all the lighter material in a laterally-confined, flotant stratum directly forwardly throughout the length of the table to discharge at the front thereof, separating partitions disposed forwardly and outwardly at an angle to the longitudinal side edge of the table for directing settled heavier material transversely to discharge at the side of the table, and a front discharge edge disposed obliquely to the forward movement of the flotant material, the separating partitions extending outward on lines the ends of which intersect the longitudinal side edge of the table and none of which outer ends intersect the front discharge edge, whereby none of the heavier material is directed over the front edge of the table.

30. In a mechanism for separating intermixed divided materials varying relatively greatly in size and relatively little in their specific gravities, such as unsized coal, the combination of a longitudinally reciprocable, air pervious table provided with means for stratifying and separating a substantially deep and continuous bed of the materials by lifting air currents and mechanical vibration, means for progressing a laterally-confined, flotant stratum of lighter material directly forwardly throughout the length of the table to discharge at the front thereof, means for directing settled heavier material transversely to discharge substantially immediately at the side of the table, means for progressively discharging the forwardly moving flotant stratum substantially proportionately according to the purification thereof, comprising a front discharge edge disposed obliquely to the forward movement of the flotant stratum, whereby the lighter material from which the impurities have been first removed is first discharged, and means for discharging a material of intermediate specific gravity from the forward tip of said discharge edge.

31. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, directing the settled heavier material by friction and inertia transversely of the forward movement of the flotant material and directly to a place of discharge at the side of the table, whereby said forwardly-impelled lighter material is progressively purified as it moves along the table, progressively discharging said lighter material substantially proportionately to the purification thereof, and selectively removing a residual portion of said forwardly-moving material as a product of intermediate specific gravity.

32. In a mechanism for separating intermixed divided materials varying relatively greatly in size and relatively little in their specific gravities, such as unsized coal, the combination of a longitudinally reciprocable, air pervious table provided with means for stratifying and separating a substantially deep and continuous bed of the materials by lifting air currents and mechanical vibration, means for progressing a laterally-confined, flotant stratum of lighter material directly forwardly throughout the length of the table to discharge at the front thereof, means for directing settled heavier material transversely to discharge at the side of the table, means for progressively discharging the forwardly moving flotant stratum substantially proportionately according to the purification thereof, comprising a front discharge edge disposed obliquely to the forward movement of the flotant stratum, whereby the lighter material from which the impurities have been first removed is first discharged, and means for selectively dividing said forwardly-discharging stream to separately discharge a material of intermediate specific gravity from the forward portion of said oblique discharge edge.

33. A mechanism for separating intermixed divided materials varying relatively greatly in size and relatively little in their specific gravities, such as unsized coal, including in combination an air-pervious table, means for maintaining thereon a bed of the intermixed materials of substantial depth, means for forcing lifting air currents upwardly through the bed to aid in loosening and stratifying the particles by floating the lighter materials while permitting the heavier materials to settle upon the table, devices for reciprocating the table longitudinally, comprising the sole force for impelling the lighter, superior, stratified material directly forwardly throughout the length of said table to a place of discharge at the front of said table, means comprising side walls of substantial height extending substantially throughout the length of the table for laterally confining said forwardly-flowing flotant material, means for directing the settled heavier material by friction and inertia transversely of the table and directly to a place of discharge at the side of the table, and outlets of variable size in said side walls for permitting lateral egress of settled heavier material.

34. A mechanism for separating intermixed divided materials varying relatively greatly in size and relatively little in their specific gravities, such as unsized coal, including in combination an air-pervious table, means for maintaining thereon a bed of the intermixed materials of substantial depth, means for forcing lifting air currents upwardly through the bed to aid in loosening and stratifying the particles by floating the lighter materials while permitting the heavier materials to settle upon the table, means for causing the heavier materials to settle to the table surface substantially according to a sequential size ratio, devices for reciprocating the table longitudinally comprising the sole force for impelling the lighter, superior, stratified material directly forwardly throughout the length of said table to a place of discharge at the front of said table, means for laterally confining said forwardly-flowing flotant material, and means for directing the settled heavier material by friction and inertia transversely of the table and directly to a place of discharge at the side of the table.

35. A mechanism for separating intermixed divided materials varying relatively greatly in size and relatively little in their specific gravities, such as unsized coal, including in combination an air-pervious table, means for maintaining thereon a bed of the intermixed materials of substantial depth, means for forcing lifting air currents upwardly through the bed to aid in loosening and stratifying the particles by floating the lighter materials while permitting the heavier materials to settle upon the table, means for causing different sized particles of heavier materials to settle to the table surface at different parts thereof, devices for reciprocating the table longitudinally comprising the sole force for impelling the lighter, superior, stratified material directly forwardly throughout the length of said table to a place of discharge at the front of said table, means for laterally confining said forwardly-flowing flotant material, and means for directing the settled heavier material by friction and inertia transversely of the table and directly to a place of discharge at the side of the table.

36. The process of separating intermixed divided materials varying relatively greatly in size and relatively little in their specific gravities, such as unsized coal, which comprises acting on a bed of the intermixed materals of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, solely by intermittent mechanical impulses, directly forwardly in a laterally restrained stream straight throughout the length of said table to a place of discharge at the front of said table, and directing the settled heavier material by friction and inertia in a plurality of divergent streams transversely of the forward movement of the flotant material and directly to places of discharge at the sides of the table.

37. A mechanism for separating intermixed divided materials varying relatively greatly in size and relatively little in their specific gravities, such as unsized coal, including in combination an air-pervious table inclined upwardly toward the front end thereof, means for forcing air currents upwardly through the table, retaining walls extending along the sides of the table substantially throughout its length, a plurality of separating partitions disposed forwardly and outwardly at an angle to the longitudinal axis of the table and lying in the plane of the table surface, means for longitudinally reciprocating the table, means for feeding materials to the rear of the table to maintain a deep and continuous bed of the materials thereon, openings in a side wall adjacent the forward and outer ends of the separating partitions for permitting substantially immediate discharge of settled heavier material therethrough, and an unobstructed discharge edge for the forwardly flowing flotant material at the front of the table.

38. A mechanism for separating intermixed divided materials varying relatively greatly in size and relatively little in their specific gravities, such as unsized coal, including in combination an air-pervious table inclined upwardly toward the front end thereof, means for forcing air currents upwardly through the table, retaining walls extending along the sides of the table substantially throughout its length, a plurality of separating partitions disposed forwardly and outwardly at an angle to the longitudinal axis of the table and lying in the plane of the table surface, means for longitudinally reciprocating the table, means for feeding materials to the rear of the table to maintain a deep and continuous bed of the materials thereon, openings in a side wall adjacent the forward and outer ends of the separating partitions for permitting substantially immediate discharge of settled heavier material therethrough, and an unobstructed discharge edge for the forwardly flowing flotant material at the front of the table, disposed diagonally to the longitudinal axis of the table.

39. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, by intermittent mechanical impulses, directly forwardly and against the action of gravity in a laterally restrained stream straight throughout the length of said table to a place of discharge at the front of said table, and directing the settled heavier material by friction and inertia transversely of the forward movement of the flotant material and directly to a place of discharge at the side of the table.

40. The process of separating intermixed divided materials varying relatively greatly in size and relatively little in their specific gravity, such as unsized coal, which comprises feeding the intermixed materials to the rear of an air-pervious table and maintaining on the table a bed of the materials of substantial depth, acting on said bed by upwardly-directed air currents and mechanical vibration to loosen the materials and stratify them by flotation of the lighter materials while permitting the heavier materials to settle upon the table, impelling the lighter, superior, stratified material by intermittent mechanical impulses directly forwardly in a laterally restrained stream straight throughout the length of said table to a place of discharge at the front of said table, said place of discharge being at or above the level of the place of feed whereby the movement of the materials is effected by forces exclusive of gravity, and directing the settled heavier material by friction and inertia transversely of the forward movement of the flotant material and directly to a place of discharge at the side of the table.

41. The process of separating intermixed divided materials varying relatively greatly in size and relatively little in their specific gravities, such as unsized coal, which comprises acting on a bed of the intermixed materials of substantial depth, supported on an air-pervious table, by upwardly-directed air currents and mechanical vibration to loosen the materials and to stratify them by flotation of the lighter materials while permitting the heavier materials to settle upon the table, impelling the lighter, superior, stratified material, by intermittent mechanical impulses, directly forwardly in a flotant stream straight throughout the length of said table to a place of discharge at the front of said table, confining said flotant stream laterally to prevent the lateral escape thereof whereby all the lighter material is discharged at the front of the table, directing the settled heavier material transversely of the forward movement of the flotant material and directly to a place of discharge at the side of the table, and preventing discharge of any of the heavier material at the front end of the table by directing all settled heavier material away from said front end.

42. A mechanism for separating intermixed, divided material varying relatively greatly in size and relatively little in their specific gravities such as unsized coal, including in combination an air-pervious table, means for maintaining thereon a bed of the intermixed materials of substantial depth, means for forcing lifting air currents upwardly through the bed to aid in loosening and stratifying the particles by floating the lighter materials while permitting the heavier materials to settle upon the table, devices for longitudinally reciprocating the table comprising means for impelling the lighter, superior, stratified material directly forwardly throughout the length of said table to a place of discharge at the front of said table, means for preventing lateral escape of said forwardly flowing flotant material whereby none of said flotant material is discharged at the side of the table, means for directing the settled heavier material by friction and inertia transversely of the table and directly to a place of discharge at the side of the table, and means for preventing discharge of any of the heavier material at the front end of the table comprising separating partitions disposed transversely and away from said front end.

43. A mechanism for separating impurities from coal including in combination a longitudinally reciprocable, air-pervious table, means for maintaining thereon a bed of intermixed coal and impurities of substantial depth undergoing stratification and separation, means for passing lifting and loosening air currents upwardly through the bed, separating partitions disposed forwardly and outwardly on the table for directing settled heavier material to the side edge thereof, means for discharging substantially all the settled heavier material at the side of the table, and means for discharging substantially all the lighter material as a purified superior stratum at the front end of the table including an oblique front edge disposed substantially parallel to the separating partitions and extending across the entire front end of the table.

44. A process for purifying raw coal which comprises maintaining a bed thereof of substantial depth, subjecting the bed to lifting and loosening air currents and longitudinal vibration to loosen the particles and stratify them and to progress the bed generally forwardly, guiding settled heavy impurities laterally to the side edge of the bed while permitting the flotant stratum of coal to travel forwardly to the front end of the bed, discharging substantially all the separated heavy impurities at the side of the bed and discharging substantially all the purified coal at the front end of the bed.

45. A mechanism for separating intermixed impurities from coal including in combination an air-pervious table, means for maintaining thereon a bed of the intermixed materials of substantial depth, means for forcing lifting air currents upwardly through the bed to aid in loosening and stratifying the particles by floating the lighter materials while permitting the heavy impurities to settle upon the table, means for reciprocating the table longitudinally thereof for progressing a flotant stratum of lighter material forwardly throughout the length of the table to discharge at the front end thereof, means for preventing lateral discharge of said lighter material, and means for moving the settled impurities laterally to discharge at the side of the table, said table normally having its front end higher than the rear end and having means for varying the elevation of said front end.

46. A mechanism for separating impurities from coal including in combination a longitudinally reciprocable, air-pervious table, means for maintaining thereon a bed of intermixed coal and impurities of substantial depth undergoing stratification and separation, means for passing lifting and loosening air currents upwardly through the bed, separating partitions disposed forwardly and outwardly on the table for directing settled heavier material to the side edge thereof, means for discharging substantially all the settled heavier material at the side of the table, and means for discharging substantially all the lighter material as a purified superior stratum at the front end of the table including an oblique front edge extending forwardly and outwardly across the entire front end of the table.

47. The process of purifying coal which comprises maintaining a relatively long and narrow bed of raw coal of substantial depth, passing lifting and loosening air currents through the bed, imparting longitudinal reciprocatory impulses to the bed, progressing the flotant stratum of coal substantially unidirectionally the length of the bed to discharge in line with said impulses at the front end of the bed, and impelling the settled heavy impurities along the bottom of the bed transversely to the longitudinal impulses to discharge directly at the side of the bed.

48. The process of purifying coal which comprises maintaining a relatively long and narrow bed of raw coal of substantial depth, passing lifting and loosening air currents through the bed, imparting longitudinal reciprocatory impulses to the bed, progressing the flotant stratum of coal substantially unidirectionally the length of the bed to discharge in line with said impulses at the front end of the bed, and impelling the settled heavy impurities along the bottom of the bed transversely to the longitudinal impulses to discharge directly at a plurality of points along the side of the bed.

49. The process of purifying coal which comprises maintaining a relatively long and narrow bed of raw coal of substantial depth, passing lifting and loosening air currents through the bed, imparting longitudinal reciprocatory impulses to the bed, progressing the flotant stratum of coal substantially unidirectionally the length of the bed to discharge in line with said impulses at the front end of the bed, impelling the settled heavy impurities along the bottom of the bed transversely to the longitudinal impulses to discharge directly at a plurality of points along the side of the bed, and individually regulating the discharge of the impurities at said points.

50. A mechanism for purifying coal including in combination a relatively long and narrow air-pervious deck, means for maintaining a bed of substantial depth of raw coal undergoing separation on the deck, means for passing lifting and loosening air currents through the bed of coal, means for longitudinally reciprocating the deck, means for directing the flotant stratum of coal substantially unidirectionally the length of the deck to discharge at the front end thereof, separating partitions disposed forwardly and across the line of reciprocation for directing settled heavy impurities along the bottom of the bed, and means adjacent the ends of the separating partitions for discharging the heavy impurities from the side of the deck.

51. A mechanism for purifying coal including in combination a relatively long and narrow air-pervious deck, means for maintaining a bed of substantial depth of raw coal undergoing separation on the deck, means for passing lifting and loosening air currents through the bed of coal, means for longitudinally reciprocating the deck, means for directing the flotant stratum of coal substantially unidirectionally the length of the deck to discharge at the front end thereof, separating partitions disposed forwardly and across the line of reciprocation for directing settled heavy impurities along the bottom of the bed, and a plurality of individually regulable discharge devices along the side of the deck adjacent the ends of the separating partitions for effecting direct discharge of the settled heavy impurities.

52. The process of purifying coal which comprises maintaining a relatively long and narrow bed of raw coal of substantial depth, passing lifting and loosening air currents through the bed, flexibly regulating said air currents along the bed, imparting longitudinal reciprocatory impulses to the bed, progressing the flotant stratum of coal substantially unidirectionally the length of the bed to discharge in line with said impulses at the front end of the bed, and impelling the settled heavy impurities along the bottom of the bed transversely to the longitudinal impulses to discharge directly at the side of the bed.

53. A mechanism for purifying coal including in combination a relatively long and narrow air-pervious deck, means for maintaining a bed of substantial depth of raw coal undergoing separation on the deck, means for passing lifting and loosening air currents through the bed of coal, means for variably controlling the air action along the deck, means for longitudinally reciprocating the deck, means for directing the flotant stratum of coal substantially unidirectionally the length of the deck to discharge at the front end thereof, separating partitions disposed forwardly and across the line of reciprocation for directing settled heavy impurities along the bottom of the bed, and means adjacent the ends of the separating partitions for discharging the heavy impurities from the side of the deck.

54. A mechanism for separating intermixed divided materials including in combination a reciprocable, air-pervious table, means for maintaining thereon a bed of said materials undergoing separation, and means for supplying lifting and loosening air currents to the bed including an air chamber beneath the table, means for supplying air under pressure thereto and devices for controlling the supply of air from the chamber to the table comprising air-controlling partitions extending downwardly from the reciprocating table, shutters arranged in a plurality of series and mounted between said partitions and the exterior walls of the air chamber, said shutters being movable to control the amount and direction of the air currents passing upwardly to the bed above them, and means operable from without the chamber for variably positioning together the shutters of one series independently of those in another series.

55. A mechanism for separating impurities from unsized coal including in combination a reciprocable, air-pervious deck having zones of differing perviosities, an air chamber beneath the deck, means for supplying air under pressure to the chamber, a plurality of longitudinally disposed walls in the air chamber for dividing the same into longitudnal compartments, means for controlling the amounts of air supplied to different compartments, and means for controlling the distribution of air from said compartments to different parts of the deck comprising variably positionable baffles within the different compartments.

56. A mechanism for separating intermixed divided materials including in combination a reciprocable, air-pervious table, means for maintaining thereon a bed of said materials undergoing separation, and means for supplying lifting and loosening air currents to the bed including an air chamber beneath the table, means for supplying air under pressure thereto, and devices for controlling the supply of air from the chamber to the table comprising a plurality of shutters movably mounted within the air chamber and disposed longitudinally therealong and a control member for variously positioning said shutters together.

57. A mechanism for separating intermixed divided materials including in combination a reciprocable, air-pervious table, means for maintaining thereon a bed of said materials undergoing separation, and means for supplying lifting and loosening air currents to the bed including an air chamber beneath the table, means for supplying air under pressure thereto, and devices for controlling the supply of air from the chamber to the table comprising a plurality of shutters movably mounted within the air chamber and disposed longitudinally therealong and a control member for variously positioning said shutters together, said control member comprising a common, inter-connecting control rod operable from without the air chamber.

58. A mechanism for separating intermixed divided materials including in combination a reciprocable, air-pervious table, means for maintaining thereon a bed of said materials undergoing separation, and means for supplying lifting and loosening air currents to the bed including an air chamber beneath the table, means for supplying air under pressure thereto, and devices for controlling the supply of air from the chamber to the table comprising a plurality of longitudinal series of shutters movably mounted at different places transversely within the air chamber and control members for variously positioning together the shutters of a set independently of another set of shutters.

59. A mechanism for separating intermixed divided materials including in combination a reciprocable, air-pervious table, means for maintaining thereon a bed of said materials undergoing separation, and means for supplying lifting and loosening air currents to the bed including a bifurcated air chamber beneath the table, means for supplying air under pressure thereto, and devices for controlling the supply of air from the chamber to different parts of the table comprising a plurality of longitudinal series of shutters movably mounted within the air chamber and control members operable from without the chamber for variously positioning together the shutters in a series.

In testimony whereof, I have signed my name to this specification.

KENNETH DAVIS.